Sept. 6, 1966           E. WEBSTER           3,270,405
MACHINE FOR ASSEMBLING LIPSTICK COMPONENTS
Filed Oct. 25, 1963           10 Sheets-Sheet 1
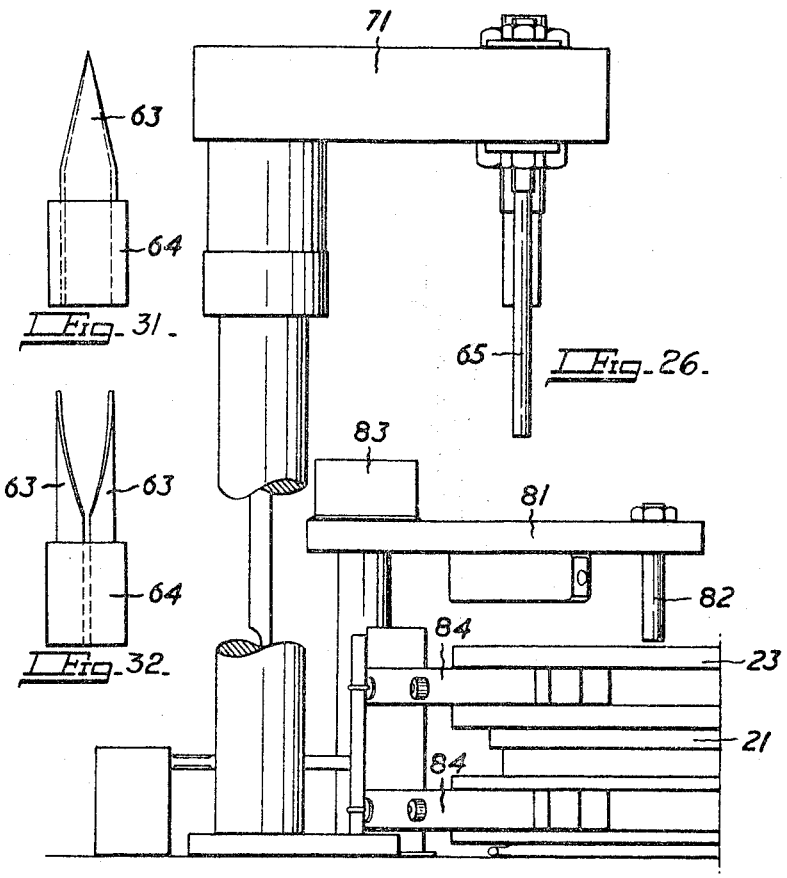
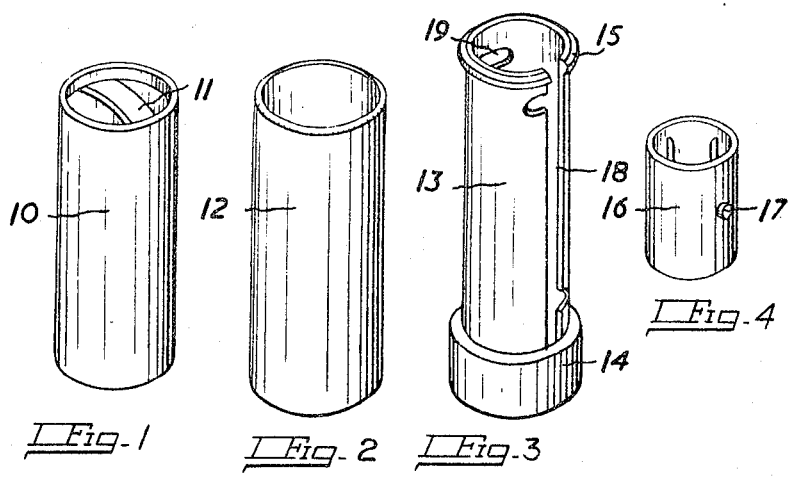
EDWARD WEBSTER
BY Scrivener & Parker

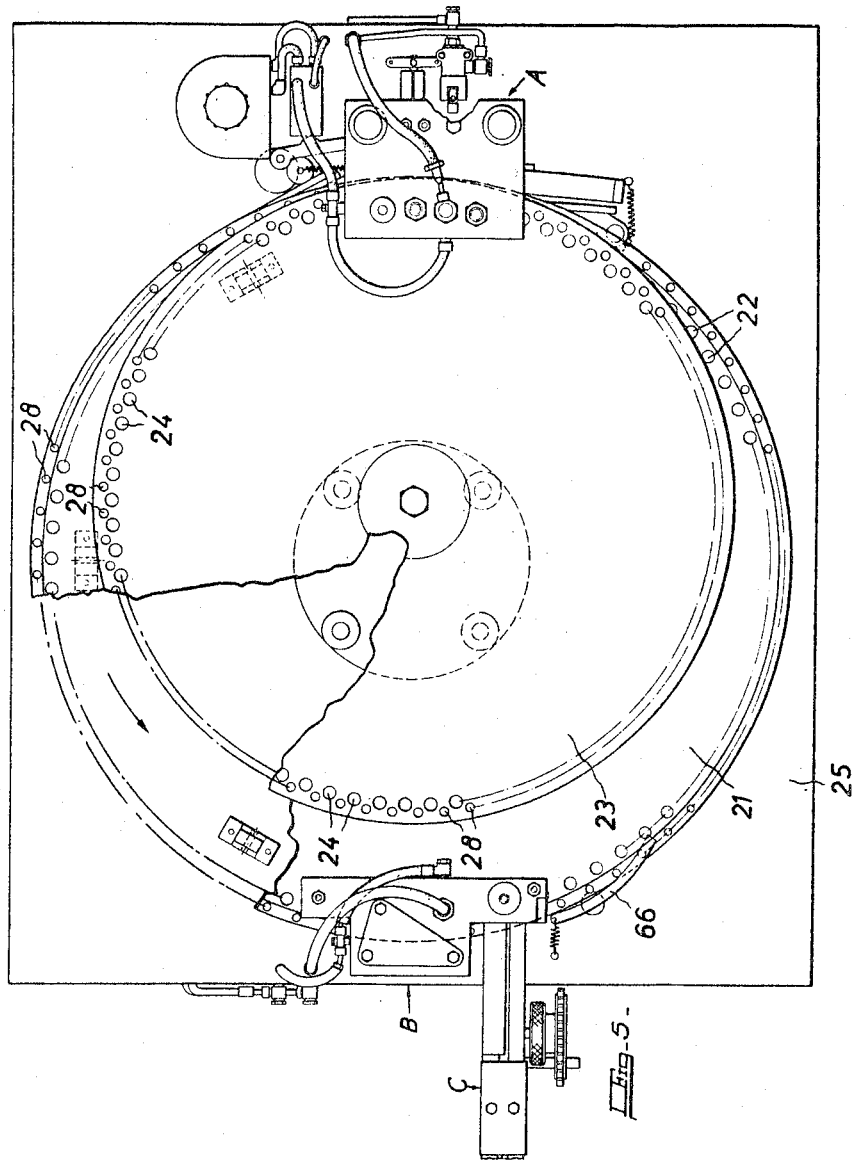

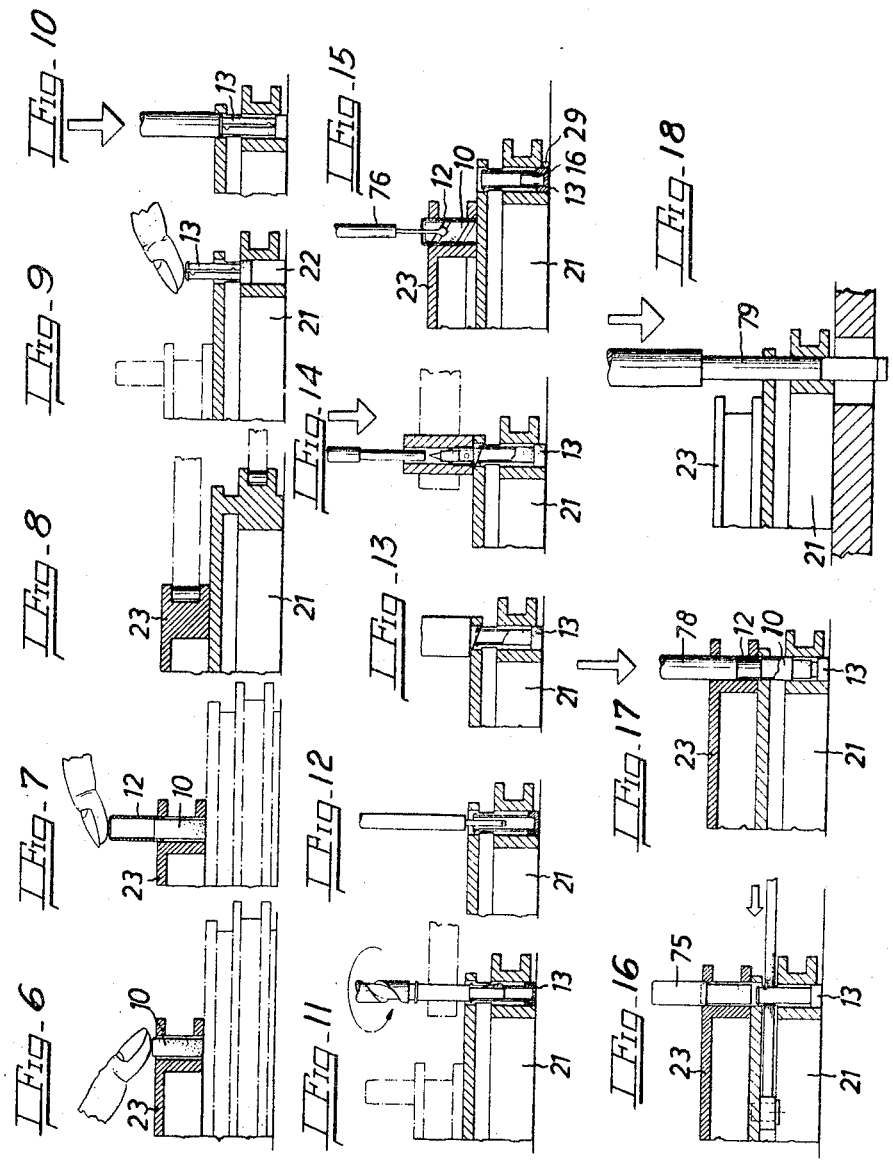

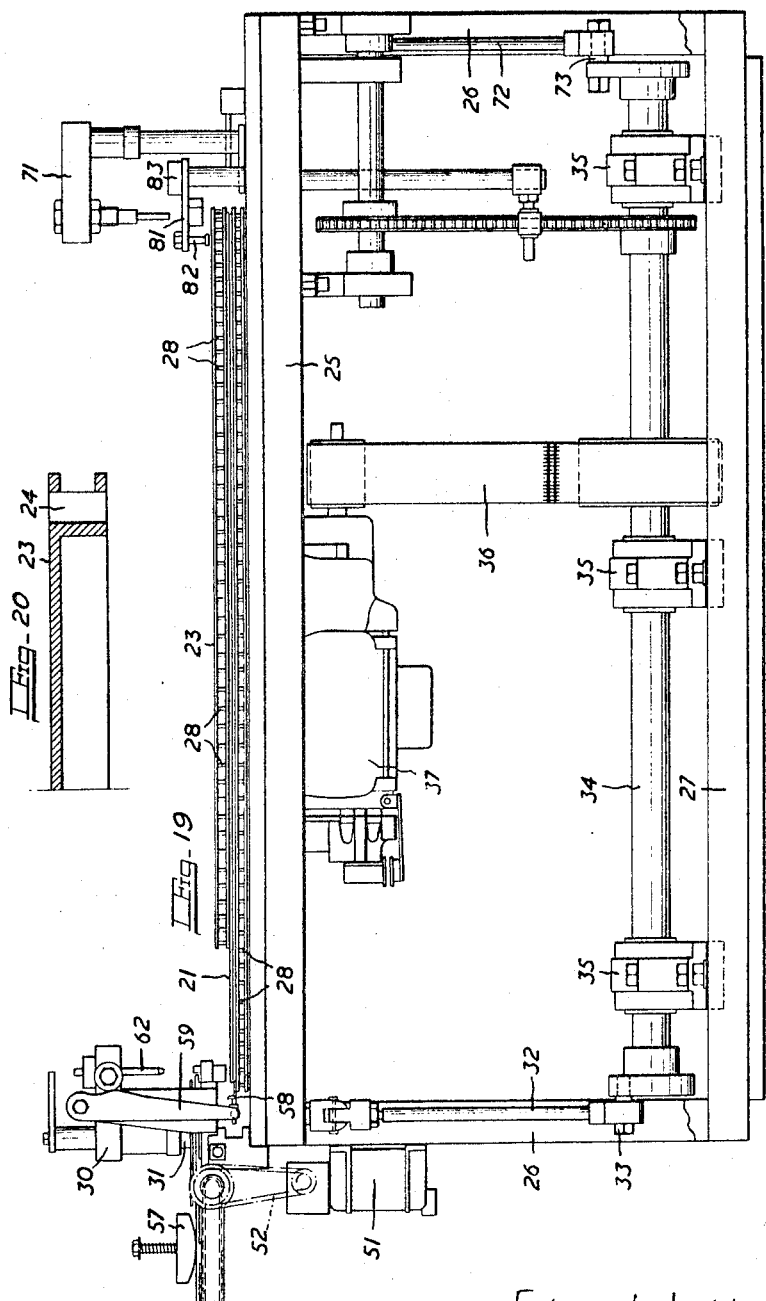

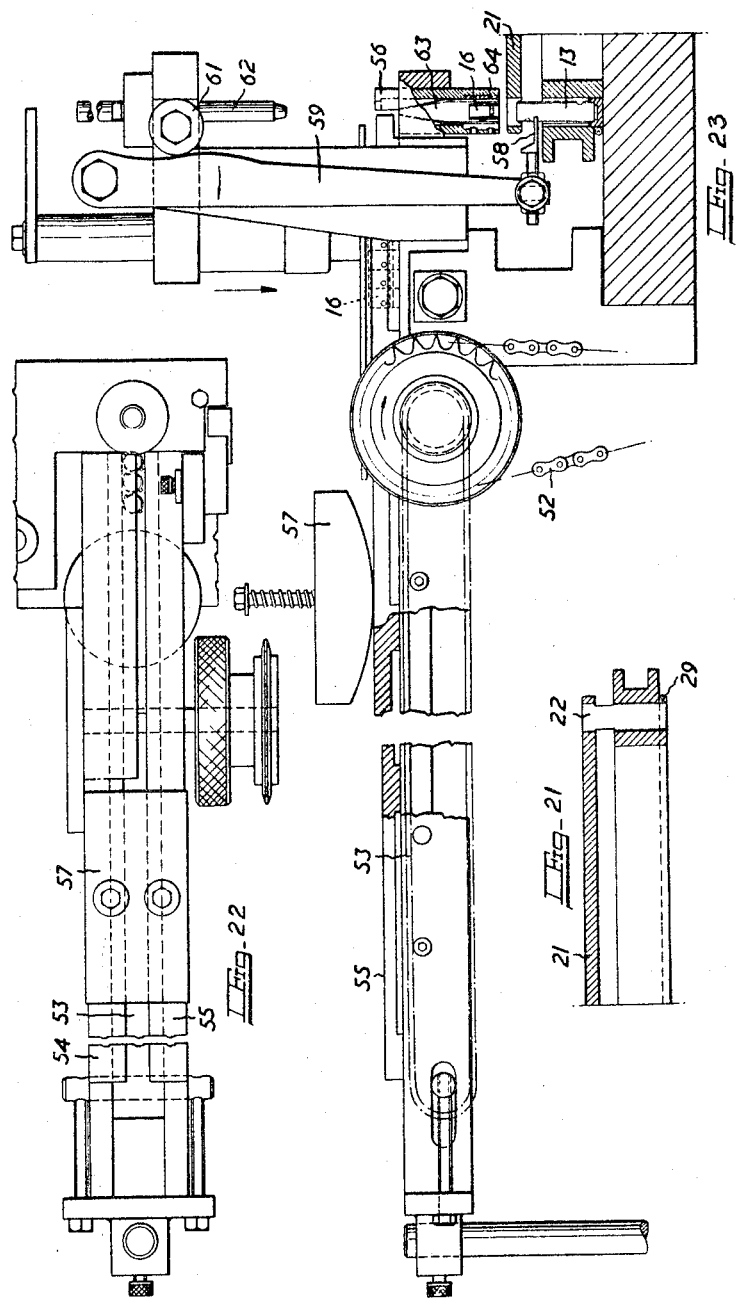

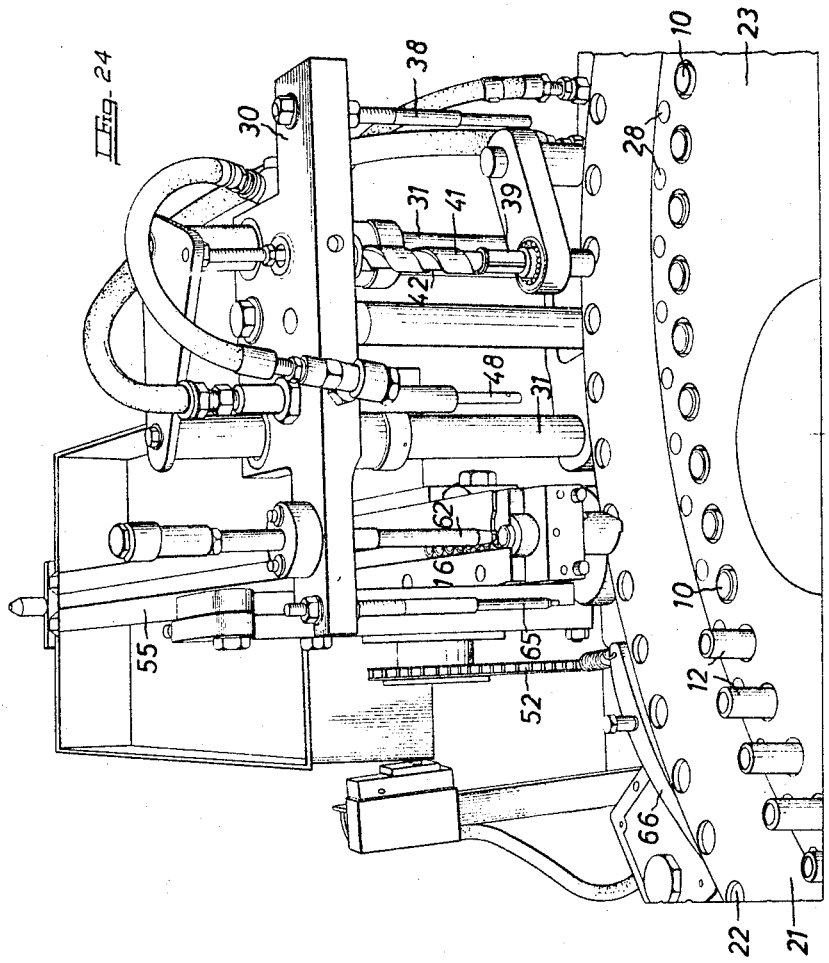

Sept. 6, 1966  E. WEBSTER  3,270,405
MACHINE FOR ASSEMBLING LIPSTICK COMPONENTS
Filed Oct. 25, 1963  10 Sheets-Sheet 7
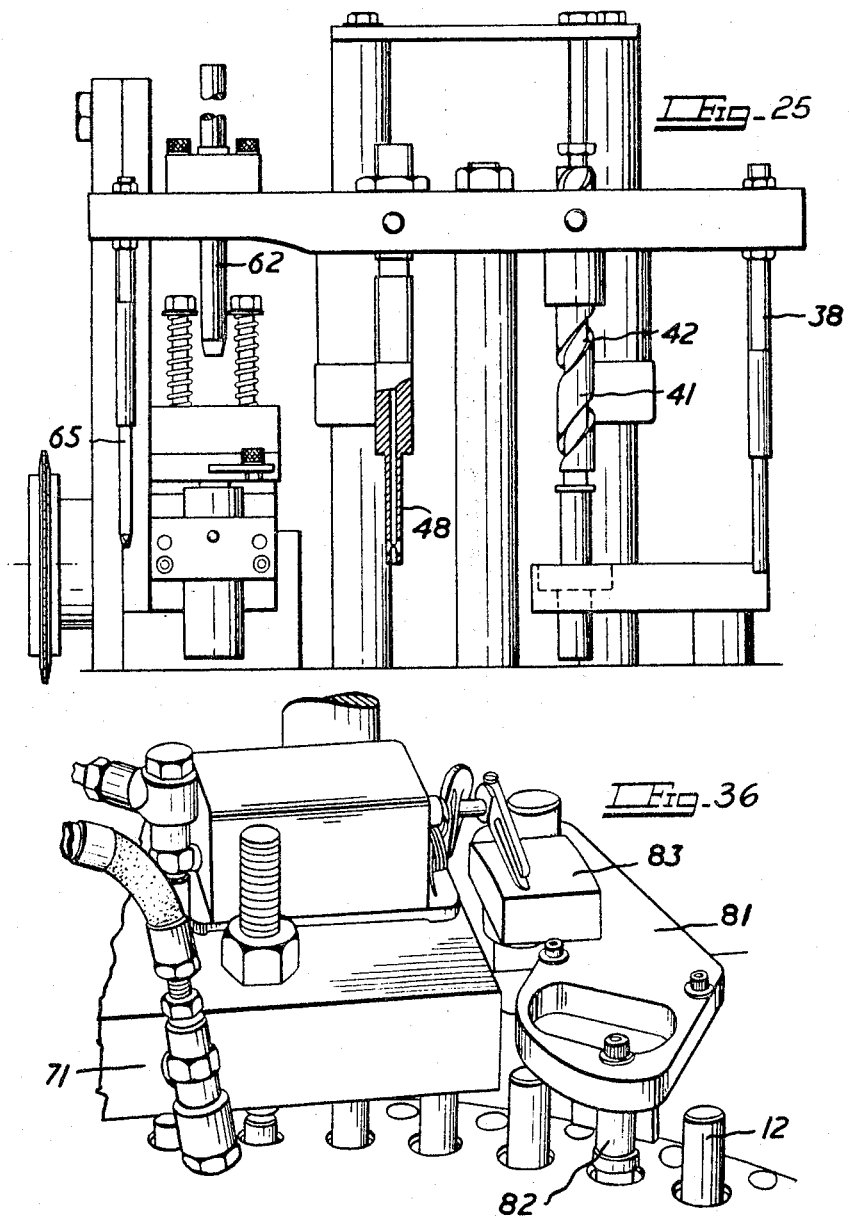
EDWARD WEBSTER
BY Scrivener & Parker

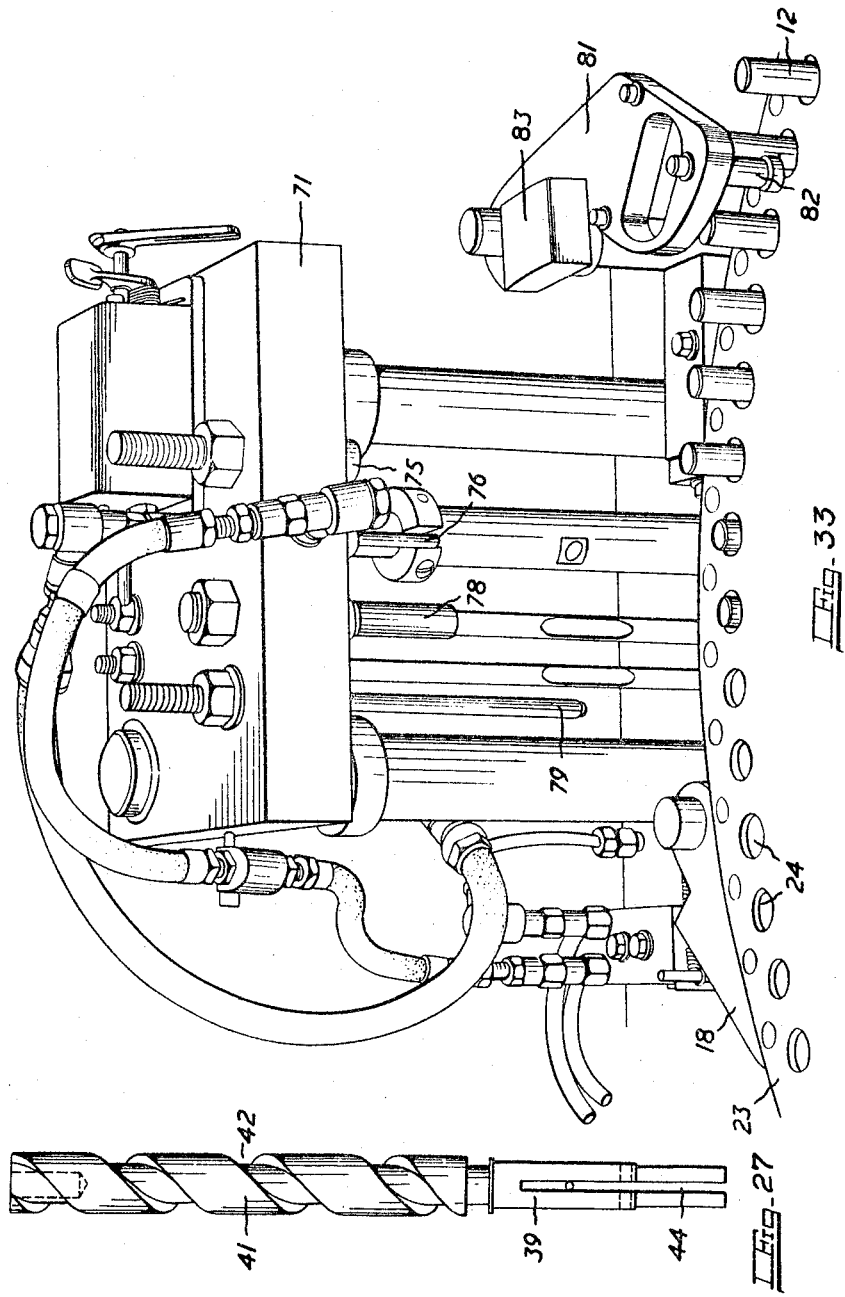

Sept. 6, 1966   E. WEBSTER   3,270,405
MACHINE FOR ASSEMBLING LIPSTICK COMPONENTS
Filed Oct. 25, 1963   10 Sheets-Sheet 9
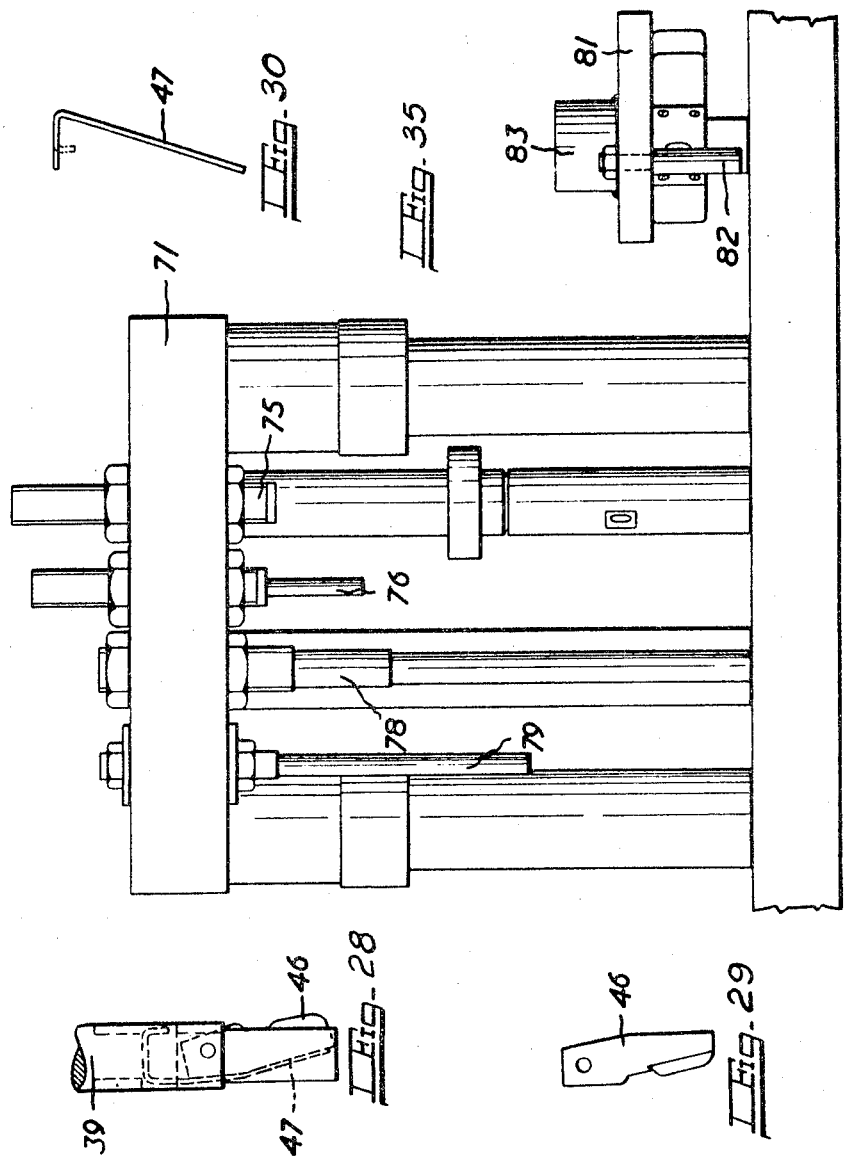
Edward Webster
BY Scrivener & Parker

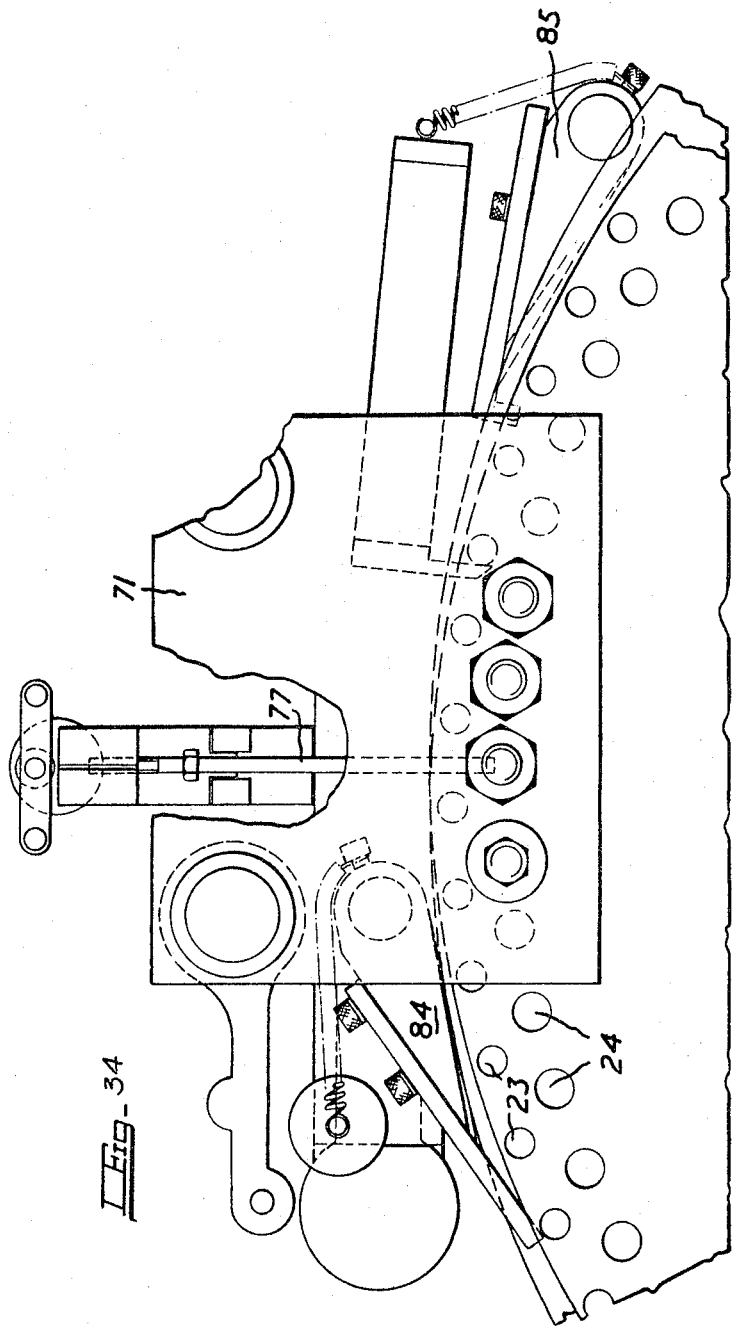

United States Patent Office 3,270,405
Patented Sept. 6, 1966

1

3,270,405
MACHINE FOR ASSEMBLING LIPSTICK
COMPONENTS
Edward Webster, Poole, Dorset, England, assignor to
Edward Webster Limited, Hampshire, England, a British company
Filed Oct. 25, 1963, Ser. No. 319,054
7 Claims. (Cl. 29—208)

This invention relates to a new and improved machine for assembling components which are slid or telescoped one into another.

One application of our invention, for example, is to the assembly of the component parts of a lipstick container.

A machine for assembling components in accordance with our invention comprises in its simplest form a circular table rotatable step-by-step about a vertical axis and having adjacent to its periphery a series of spaced holes to receive components, a similar table of smaller diameter wholly super-imposed on the first table and rotatable step-by-step about an axis offset from that of the first table, the holes in the two tables registering at at least one point after each angular step-by-step movement of the tables, and intermittently operating means actuated in synchronism with the tables for forcing a component in a hole in the upper table over or into a component in the hole in the lower table at the point where these holes are in register.

As the upper table is of smaller diameter than the lower table, and the holes are located adjacent to the peripheral edges of the tables, the holes in the lower table are accessible over a considerable part of its circumference for the insertion of components into the holes.

The tables are conveniently rotated step-by-step by ratchet and pawl mechanism so arranged that the peripheral edge of the lower table is moved at each step through a slightly greater distance than that of the upper table to compensate for the difference in the diameters of the tables, so that the tables are moved through equal angles at each step and successive holes in the tables register accurately at the point where assembly takes place.

Means may be incorporated in the machine for performing subsidiary operations or sub-assembly operations on one or both components at one or more points in advance of the final assembly point and for ejecting the assembled components.

As an example of an assembly machine embodying our invention we have illustrated in the accompanying drawings a machine designed for assembling the component parts of one particular form of lipstick container wherein:

FIG. 1 is a perspective view of a plastic shell for a lipstick container incorporated in the present invention;

FIG. 2 is a perspective view of a cover for the shell of FIG. 1;

FIG. 3 is a perspective view of a slotted member adapted to be received within the shell of FIG. 1;

FIG. 4 is a perspective view of a cup or godet which is adapted to receive the lipstick within the slotted member of FIG. 3;

FIG. 5 is a plan view of a machine embodying features of the present invention;

FIGS. 6–18 illustrate diagrammatically the principal steps in the assembly of the components;

2

FIG. 19 is a side elevation of the complete machine showing the driving mechanism;

FIG. 20 is a fragmentary section of the edge of the upper table;

FIG. 21 is a similar section of the edge of the lower table;

FIG. 22 is a plan of the means for feeding godets to the sub-assembly head which inserts the godets into the inner members of the containers;

FIG. 23 is a side elevation in part section of the feeding mechanism shown in FIGURE 19 and of the means for effecting one of the sub-assembly steps;

FIG. 24 is a perspective view of the sub-assembly head and the adjacent parts of the tables viewed from a point above the centre of the tables;

FIG. 25 is an elevation of the sub-assembly head from the inner side;

FIG. 26 is an end elevation of the sub-assembly head;

FIGS. 27 to 32 are views of details of the mechanism in the sub-assembly head;

FIG. 33 is a perspective view of the final assembly head viewed from a point above the centre of the table;

FIG. 34 is a plan of the final assembly head;

FIG. 35 is an end view of the head;

FIG. 36 is a perspective view of the head in its lowermost position.

These components are: a plastic shell 10 having two diametrically opposed internal helical grooves 11, a thin ornamental metal outer shell or cover 12 adapted to fit tightly over the shell 10 and having an inturned lip at its upper end, a longitudinally slotted inner member 13 having a base 14 of a diameter greater than that of the body of the member and having at its upper end a radially projecting lip or flange 15, and a cup or godet 16 which is adapted to receive a lipstick, and has opposed radially projecting pegs 17. The inner member has two diametrically opposed longitudinal slots 18 and 19 of which the slot 18 extends through to the upper end of the member and the slot 19 terminates short of the upper end.

In the assembled container the shell 10 fits over and is rotatable on the inner member 13 between the base 14 and the flange 15 which confine it axially, and the godet is axially slidable in the inner member, the pegs 17 working in the longitudinal slots 18 and 19 in the inner member 13 and in the helical grooves 11 in the shell, so that relative rotation between the shell and the inner member moves the godet axially to project and retract the lipstick.

It will be appreciated that in assembling the components the godet must be correctly oriented with respect to the longitudinal slot in the inner member 13, and as the flange 15 on the inner member is of a diameter greater than the internal diameter of the shell the upper end of the inner member must be contracted by overlapping the parts of the open end of the inner member on opposite sides of the slot 18 to allow the shell to be fitted over it.

FIGURE 2 of the accompanying drawings shows in plan the machine by which the assembly of the components is effected.

It consists essentially of a circular bottom table 21 rotatable step-by-step about a vertical axis and having adjacent to its periphery a series of angularly spaced holes 22, and a superimposed upper table 23 of smaller diameter having an equal number of angularly spaced holes 24 and rotatable step-by-step about a vertical axis offset from the axis of the bottom table. The offsetting of the axes of the tables in relation to the relative diameters of the tables is such that at one point each hole in the upper table in turn registers with a hole in the lower table and over most of the remainder of the periphery of the bottom table the holes 22 are uncovered and accessible for the insertion of components.

A final assembly head A operated in synchronism with the step-by-step rotation of the tables is located over the part of the tables where the holes register, and at a diametrically opposite point there is a subassembly head B for assembling into inner members in the holes in the bottom table godets which have been fed to it by feeding mechanism indicated at C.

Before describing the machine and the various parts thereof in detail we refer to FIGURE 3 of the accompanying drawings which shows diagrammatically the major steps in the assembly of the components.

These are, respectively:

(6) The manual insertion of a shell 10 into one of the holes in the upper table 23.

(7) The manual fitting of an outer shell or cover 12 over the upper part of the shell 10.

(8) The step-by-step rotation of the tables to carry the components round.

(9) The manual insertion of an inner member 13 into a hole in the lower table 21.

(10) The forcing of the inner member down to the bottom of the hole.

(11) The orientation of the inner member in its hole.

(12) The spraying of lubricant on to the inner surface of the inner member.

(13) The location over the inner member of a guide for a godet 16.

(14) The feeding of a godet into alignment with the inner member and its insertion into the member.

(15) The spraying of lubricant mist into a shell in a hole in the upper table.

(16) The coming into alignment of a hole in the upper table containing a shell carrying an outer shell or cover and a hole in the lower table containing an inner member, and the closing in or contraction of the upper end of the inner member.

(17) The forcing of the shell with the outer shell or cover down over the inner member.

(18) The ejection of the assembled container.

As shown in FIGURES 5 and 19 the rotatable bottom table 21 works over a fixed table 25 which is supported by columns 26 from a base 27. The holes 22 to receive the inner components 13 of the lipstick containers are set in from the edge of the table and are equally spaced angularly from each other. Further holes on the outer side of the holes 22 and located angularly between the holes 22 receive hardened steel pegs or dowel pins 28 which are exposed in a circumferential groove in the table and are adapted to be engaged by pawls for rotating the table step-by-step as described below. This construction is preferred to the use of ratchet teeth on the periphery of the table as the pegs 28 can be readily renewed when worn.

A peripheral groove around the bottom of the table and set in from its edge receives a continuous garter spring 29 (FIGURE 21) which intersects the outer edges of the holes 22 and provides a frictional grip for the bases of inner components inserted into the holes to hold these components against angular movement except when they are moved positively as described below.

The upper table is formed with a ring of equally spaced holes 24 of the same number as the holes 22 in the lower table and located at the same distance from the peripheral edge of the table. The holes in the two tables have the same angular spacing but the distance between adjacent holes in the lower table is greater than that between adjacent holes in the upper table owing to the difference in the diameter of the tables.

The upper table has a peripheral ring of dowel pins or pegs 28 similar to those in the bottom table for engagement with pawls which rotate the upper table step-by-step through the same angle at each step as the bottom table is rotated.

The tables rotate in the direction shown by the arrow in FIGURE 5. The inner components 13 are inserted with their open ends uppermost into the holes in the bottom table at the side which is at the top in FIGURE 5 and the shells may also be inserted into the holes in the upper table at that side, while the ornamental outer shells or covers are fitted over the upper ends of the shells on the other side of the table.

The insertion of the components into the holes may be effected manually, operators located on opposite sides of the machine picking up components from trays to which components are fed by shoots or small conveyors. Alternatively, automatic power driven feeds may be provided for inserting components into the holes in the tables at appropriate points.

The holes in the bottom table into which the inner members of the lipstick container have been inserted are carried successively under the sub-assembly head indicated at B in FIGURE 5 and comprising a tool-carrying cross-head 30 which is reciprocated vertically in synchronism with the movements of the table, the cross-head being guided on fixed vertical pillars 31. The reciprocation of the cross-head is effected by a connecting rod 32 from a crank-pin 33 on one end of a horizontal shaft 34 mounted in bearings 35 on the base of the machine. The shaft is driven by a belt 36 from an electric motor 37.

The cross-head 30 carries a number of tools spaced at the same angular spacing as the holes in the table and which are shown in FIGURES 24 to 32 of the drawings.

The first tool 38 is a punch which, as each inner member comes under it, pushes the member down to the bottom of the hole in the table. The member then moves under the second tool which is shown in detail in FIGURES 27 to 29. The tool 39 is mounted in the lower end of a spindle 41 having a helical groove 42 engaged by a pin or peg so that the spindle is rotated as it descends. The lower end of the tool which enters the member is longitudinally slotted at 44, and pivotally mounted in the slot is a tongue 46 loaded by a wire spring 47 which urges the free end of the tongue outwardly. The tool is moving angularly as it enters the member which is frictionally held by the garter spring 29, and the tongue engages in the longitudinal slot 18 in the member so that the member then moves angularly with the tool, and at the end of the stroke the member is correctly oriented for the insertion of the godet.

In the next position a tube 48 enters the member and a small quantity of lubricant is sprayed on to the inner surface of the member to facilitate the free movement of the godet in the member. The lubricant is conveniently injected by an air jet supplied with compressed air through a valve controlled by a trip device on the cross-head.

The inner member then moves into the position where the godet is inserted.

Godets are fed continuously to this point by the means more particularly shown in FIGURES 22 and 23. A small electric motor 51 (seen in FIGURE 19) drives through a chain 52 a sprocket on one end of a horizontal roller forming the driving end of a canvas or other flexible conveyor belt 53 travelling radially towards the table below two spaced parallel guides 54, 55. The godets, with their open ends uppermost, are fed by an operator on to the belt at the outer end of the guides and are carried along by the belt between the guides. The width between the guides is slightly greater than the outside diameter of a godet but less than the diameter inclusive of the radially projecting pegs 17, so that the godets are necessarily fed forwardly in an angular position in which each pair of pegs lie in a vertical plane other than one at right angles to the guides.

The belt is driven at a speed slightly greater than the rate at which the godets are used in order to keep them in close contact as they reach the assembly point, the forward godet being fed against an arcuate surface 56 in vertical alignment with a hole in the table. A spring-loaded pad 57 bears on the upper surfaces of the godets during a portion of their movement to maintain a downward pressure causing the godets to be carried along by the conveyor and ensuring uniform feeding.

At the assembly point a wedge 58 carried at the lower end of a pivoted arm 59 cooperating with a roller 61 on the cross-head moves transversely into the open-ended slot 18 in the inner member which has been correctly oriented by the second tool as described above, and the wedge expands the upper end of the member to receive the godet, which is pushed downwardly into the inner member by a punch 62. The punch has an inclined face to apply an offset thrust to the godet, and as the godet moves downwardly it passes between two diametrically opposed blades 63 seen in FIGURES 2, 3, 31 and 32 which are tapered off to points at their upper ends, a line joining the points being at right angles to the line of the conveyor belt. The opposed pegs on the godet ride down the inclined faces of the blades which guide them into opposed slots in a sleeve 64 and orient the godet in a position in which the pegs are aligned with the longitudinal slots in the inner member. The godet is restrained from dropping under gravity through the upper part of the housing from the blades 63 by one or more radial spring-pressed balls in the housing which frictionally hold the godet until it is positively pushed down by the punch 62. This frictional holding of the godet prevents the possibility of two godets being fed into the same inner member. A small stripper (not shown) is also provided at this point to prevent the godet from returning with the punch.

The inner member with the godet in it then moves into the next position where a plunger 65 on the cross-head pushes the godet right down to the bottom of the inner member.

The rotation of the table then carries the inner members round away from the subassembly point, and shortly after leaving that point they are engaged by a spring-loaded finger 66 with re-orients them preparatory to the final assembly which takes place at the opposite side of the tables where each hole in the upper table containing a shell registers with a hole in the lower table containing an inner member and godet.

The final assembly is effected by tools carried by a vertically movable cross-head 71 operated in synchronism with the tables by a connecting rod 72 from a crank-pin 73 on the driving shaft.

As the components approach the position in which the holes in the two tables come into register the shells in the holes in the upper table are pushed downwardly into the holes by a plunger 75 (FIGURE 33) followed by a hollow plunger 76 through which a very small quantity of lubricant is injected in the form of a mist into the shell to facilitate the free rotation of the inner member in the shell. Then in the position in which the holes in the two tables are in register a reciprocating member located in a recess in the underside of the table moves outwardly through a radial hole to engage the inner side of the component in the hole in the bottom table and simultaneously a reciprocating finger 77 (FIGURE 34) which is substantialy radial with respect to the table comes in and forces inwardly the outer wall of the member near its upper end on one side of the open slot to contract the upper end of the member. Simultaneously a punch 78 in the cross-head comes down and forces the shell 10 together with the outer shell or cover 12 down over the inner member 13 to which the shell is locked axially by the flange 15 on the upper end of the inner member as soon as the fingers are retracted.

Finally the assembled container passes on to the next position under an ejector punch 79 which pushes it out through the hole in the bottom table and through an opening in the fixed table into a hopper, chute, or other collecting means. As it leaves the machine the container may be caused to follow a tortuous path over a number of oppositely inclined grids to shake off any particles of fraze removed from the plastic shell when the metal outer shell or cover is forced over it.

In advance of the final assembly point there is a pivoted member 81 (FIGURE 33) carrying a finger 82 which engages the shells in the holes in the upper table as they pass. A switch 83 mounted on the member 81 is actuated to stop the machine if a shell is over size.

The step-by-step rotation of the tables is effected by pawls 84 co-operating with the dowel pins or pegs in the periphery of the tables. The pawl actuating the bottom table moves through a greater distance on each operative stroke than that actuating the upper table, the difference being such that the tables are moved through equal angles at each step. The pawls may be carried by a reciprocating slide actuated by the means for actuating the cross-head so that all the movements are synchronised. Reverse movement of the tables is prevented by stop pawls 85.

It will be appreciated that the holes in the tables are of the appropriate diameter to hold the components accurately in position, and there is no risk of damaging components through misalignment or canting of the components.

I claim:
1. A machine for assembling components of the type adapted to be slid and telescoped one into another comprising a first circular table having adjacent to its periphery a series of spaced holes to receive components, a first vertical axis about which said first table is rotatable, means for rotating said first table step-by-step about said first axis, a second circular table of a diameter smaller than the diameter of said first table wholly superimposed on said first table and having adjacent to its periphery a series of spaced holes to receive components, a second vertical axis offset from said first vertical axis and about which said second table is rotatable, means for rotating said second table step-by-step about said second axis, holes in the two tables registering at least one point after each angular step-by-step movement of the tables, and intermittently operating means actuating in synchronism with the tables to force a component in a hole in one of said tables into engagement with a component in a hole in the other of said tables at a point where said holes are in registry.

2. A machine as claimed in claim 1 wherein the holes in the two tables are equal in number and the angular spacing between adjacent holes in both tables is the same, and said table rotating means are operative to rotate the tables simultaneously step-by-step through angular steps equal to the angular spacings between adjacent holes.

3. A machine as claimed in claim 1 wherein said means for rotating said tables comprise ratchet and pawl mechanisms of which a pawl co-operating with the first table has a greater travel on its operative movement than a pawl co-operating with the second table to compensate for the difference in the diameter of the tables.

4. A machine as claimed in claim 3, and further including power means for operating said pawls, and hardened dowel pins located in an annular groove in the periphery of each table with which the pawl for rotating that table co-operates.

5. A machine as claimed in claim 1 and further including a second intermittently operating means actuated in synchronism with the tables for assembling parts into the components in holes in the first table at a point where these holes are uncovered by the second table.

6. A machine as claimed in claim 5 and further including a conveyor arranged to feed parts to said second intermittently operating means by which said parts are assembled into components in said first table.

7. A machine as claimed in claim 5 and further incorporating in said second intermittently operating means mechanism for angularly adjusting the components and the parts which are assembled into them.

References Cited by the Examiner

UNITED STATES PATENTS

| | | | |
|---|---|---|---|
| 1,830,446 | 11/1931 | Schunemann | 29—208 |
| 2,810,249 | 10/1957 | Wysocki | 53—317 |
| 3,005,255 | 10/1961 | Wilson | 29—208 |
| 3,112,562 | 12/1963 | Wilson | 29—211 X |
| 3,141,278 | 7/1964 | Wysocki | 53—319 |

JOHN F. CAMPBELL, *Primary Examiner.*

T. H. EAGER, *Examiner.*